US009486694B2

(12) United States Patent
Bastawros

(10) Patent No.: US 9,486,694 B2
(45) Date of Patent: *Nov. 8, 2016

(54) GOLF GAME MANAGEMENT AND ENTERTAINMENT SYSTEM INTEGRATING PRE-GAME, IN-GAME, AND POST-GAME CONTENT FOR PERFORMANCE DATA COLLECTION

(71) Applicant: Peter S. Bastawros, Richardson, TX (US)

(72) Inventor: Peter S. Bastawros, Richardson, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/859,938

(22) Filed: Sep. 21, 2015

(65) Prior Publication Data

US 2016/0008696 A1    Jan. 14, 2016

Related U.S. Application Data

(63) Continuation of application No. 13/829,465, filed on Mar. 14, 2013, now Pat. No. 9,138,638.

(51) Int. Cl.
*A63F 9/24* (2006.01)
*A63B 71/06* (2006.01)
*A63F 13/00* (2014.01)
*G01S 19/19* (2010.01)

(52) U.S. Cl.
CPC .......... *A63B 71/0669* (2013.01); *A63F 13/00* (2013.01); *G01S 19/19* (2013.01)

(58) Field of Classification Search
CPC .......... A63B 71/0669; A63B 2220/53; A63B 2243/0029; A63B 2220/12; A63B 2024/0056; A63B 2220/16; A63B 2071/0647; A63B 2220/833; A63B 2220/803; A63B 2069/362; A63B 2220/40; A63B 2225/20; A63B 2071/0691; A63B 71/0622; A63B 2220/13; A63B 2024/0025; A63B 24/00; A63B 55/00; A63B 2220/80; A63B 2220/801; A63B 24/0021; A63B 71/0616; A63B 2225/50; A63B 2220/14; A63B 2225/15; A63B 2220/836; A63B 2220/51; A63B 2220/30; A63B 2225/54; G06Q 10/10; A43B 5/001; A43B 5/16; A43B 3/0005; G06F 19/3481
USPC ........................................ 700/91, 93
See application file for complete search history.

(56) References Cited

U.S. PATENT DOCUMENTS

| | | | | |
|---|---|---|---|---|
| 6,224,387 B1 * | 5/2001 | Jones | ......... | A63B 71/0622 434/247 |
| 6,236,360 B1 * | 5/2001 | Rudow | ......... | A63B 24/0021 340/995.1 |
| 6,456,938 B1 * | 9/2002 | Barnard | ......... | A63B 57/00 340/990 |
| 2002/0188702 A1 * | 12/2002 | Short, III | ......... | G01C 21/36 709/220 |
| 2004/0102931 A1 * | 5/2004 | Ellis | ......... | A61B 5/1038 702/188 |
| 2005/0228547 A1 * | 10/2005 | McDonnell | ......... | A63B 71/06 701/1 |
| 2005/0250590 A1 * | 11/2005 | Doaga | ......... | A63B 71/06 473/150 |
| 2007/0016438 A1 * | 1/2007 | Bain | ......... | G06Q 30/06 705/1.1 |

(Continued)

*Primary Examiner* — Michael Cuff
(74) *Attorney, Agent, or Firm* — Lazaris IP

(57) ABSTRACT

Golf game management integrates pre-game, in-game, and post-game activities for a golf game into a unified experience. A golf cart-mounted entertainment console includes video cameras, sensory devices worn by the players during the game, and locally-mounted data processing components for modeling collected data. A cart-mounted interface, website, and mobile device application present game-related content that allows players to view and manipulate data before, during and after the game. Multiple data processing modules provide several functions built on data collected from playing a game of golf for players to enjoy an enhanced golf experience.

22 Claims, 6 Drawing Sheets

(56) References Cited

U.S. PATENT DOCUMENTS

| | | | |
|---|---|---|---|
| 2008/0108456 A1* | 5/2008 | Bonito | A63B 24/0084 473/409 |
| 2009/0305822 A1* | 12/2009 | Ko | A63B 69/36 473/409 |
| 2011/0191023 A1* | 8/2011 | Engstrom | A63B 57/00 701/532 |
| 2011/0230986 A1* | 9/2011 | Lafortune | A43B 3/0005 700/93 |
| 2012/0004956 A1* | 1/2012 | Huston | G06Q 30/0207 705/14.1 |
| 2013/0113956 A1* | 5/2013 | Anderson | G06F 3/017 348/223.1 |
| 2014/0257141 A1* | 9/2014 | Giuffrida | A61B 5/1124 600/595 |

* cited by examiner

GOLF GAME MANAGEMENT AND ENTERTAINMENT SYSTEM INTEGRATING PRE-GAME, IN-GAME, AND POST-GAME CONTENT FOR PERFORMANCE DATA COLLECTION

CROSS-REFERENCE TO RELATED PATENT APPLICATIONS

This patent application claims priority to, and is a continuation of, U.S. non-provisional application Ser. No. 13/829,465, filed on Mar. 14, 2013, the contents of which are incorporated in their entirety herein. In accordance with 37 C.F.R. §1.76, a claim of priority is included in an Application Data Sheet filed concurrently herewith.

STATEMENT REGARDING FEDERALLY-SPONSORED RESEARCH OR DEVELOPMENT

Not applicable.

FIELD OF THE INVENTION

The present invention relates to a golf game management and entertainment system. Specifically, the present invention relates to a system and method of enhancing a golfing experience by processing and modeling data related to player shots and presenting augmented data analytics and data manipulation functions to players during and after a game of golf.

BACKGROUND OF THE INVENTION

There are several existing systems and methods of augmenting and enhancing a game of golf. Many of these systems and methods relate to improving shot-making during a game, and utilize global positioning devices to determine player and shot location while a game of golf is in progress on a golf course.

Many of these systems and methods rely on either handheld measurement devices or products attached to golf clubs to provide information required for meaningful assistance to a golfer in playing a game. Each of these, however, carries with it significant drawbacks.

For example, the use of hand-held devices requires a golfer to spend extra time handling the device, which takes away from the user's experience in actually playing the game. Hand-held devices must also be carried by the golfer, usually either in a golf bag or in one's pocket, resulting in having to think about where the device is instead of enjoying the game in-progress. The golfer may forget to use it, resulting in inconsistent data collection and a degradation of the quality of functionality provided. Finally, such devices may get lost during a game. Meanwhile, devices attached to golf clubs introduce a bulky component to the clubs, which are increasingly engineered to be light-weight, high-performance playing equipment. They may also be easily damaged or broken during club use.

U.S. Patent Application No. 2009/0305822 teaches a prior art system and method for enhancing a golf game in which a global positioning system is used to establish a score database for players. Scoring information is obtained from global positioning devices and stored locally before being updated to a remote computer at a later time. However, there is no method of real-time score updating to provide golfers with in-progress information about their game, or a real-time summary of how others in a golfer's party are faring on the course. There is also no enhanced functionality for making the game more interesting by being able to view video taken or getting shot assistance information while the game is in progress.

BRIEF SUMMARY OF THE INVENTION

The present invention is a golf game management and entertainment package that provides enhanced, 360-degree coverage of a player's golf game by integrating pre-game, in-game, and post-game activities into a single, unified experience. The present invention includes a cart-mounted golf entertainment console and data collection devices that include video cameras and microphones, along with sensory devices worn by the players during the game. Data processing components are included at the golf entertainment console and remotely at one or more database locations and servers. Players may use a graphical user interface on the golf cart, as well as a website and a mobile device-based application before, during and after a game. A cloud-based data management system manages and stores player information and provides game-related content for users on all interfaces.

In one embodiment of the present invention, a "Game Cart" framework provides an in-game, or game time, mode that requires minimal intervention by the player during the course of a golf game. A player will only need to signal the golf cart for when to record the shot, acknowledge the club selection, and adjust their score for a hole if they incur penalty strokes. This embodiment includes several features performed by data processing modules designed to enhance the golfer's experience based modeling of data collected after the player signals the golf cart to initiate a data collection sequence.

In another embodiment of the present invention, a "Game Space" framework may be a subscription-based service provided to players who want to extend their entertainment experience beyond the duration of an actual game of golf. Players are able to access the features provided by the data processing modules discussed in more detail herein remotely from a web site or mobile portal, such as via a phone-based application. This framework presents a virtual clubhouse designed to connect pre-game and post-game activities of players with their in-game, or game-time, experiences. Players are able to create their own Game Space or join those created by another player. Members of a Game Space can view other players' shots, scores, and statistics, make comments, propose and organize new games, search for courses, make reservations, get directions, and coordinate meetings.

Accordingly, in one aspect, the present invention is a method of conducting golf game management to provide an enhanced golf experience, comprising receiving a signal transmitted from a first local point to begin a data collection sequence, and data from a global positioning device at the first local point, over at least one wireless connection a location proximate to the first local point; recording, at the location proximate to the first local point, a plurality of data relating to a golf shot during the data collection sequence, the plurality of data including a first video of a player conducting the golf shot on a golf course, and a second video of the golf shot at a second point distant from the location proximate to the first local point, the recording including configuring at least one of a pan, tilt, and zoom function determined by the data received from the global positioning device; processing game-related data extracted from the plurality of data relating to the golf shot with golf course data in a geographic information system, and periodically integrating the plurality of game-related data as additional data is collected from additional data collection sequences, in a plurality of data manipulation modules to generate output data representative of different characteristics of a golf game to be viewed and manipulated to enhance the golf game by one or more players, the output data representative of different characteristics of a golf game at least including a golf game scorecard, a real-time golf game leader board tracking game statistics, player statistics, player rankings, a layered course map, a plurality of video playback functions, and a player's shot statistics; and presenting the output data representative of different characteristics of a golf game to a user interface accessible by one or more players in at least one of a cart-based graphical user interface, a web-site managed by a remote web server, and a mobile application.

In another aspect, the present invention is a golf entertainment system, comprising a plurality of golf cart-based components configured to locally manage one or more aspects of an in-progress golf game, at least including a data capture apparatus having a plurality of video cameras, a global positioning device, a wireless data transmission and reception connection, a graphical user interface, and one or more processors capable of manipulating and transmitting data captured by the data capture apparatus, and executing one or more instructions configured to perform a plurality of data processing functions to process game data collected by the data capture apparatus and generate output data representative of different characteristics of the in-progress golf game; a plurality of player-based components capable of wirelessly communicating with the golf cart-based components, the plurality of player-based components at least including a headset and a global positioning device coupled to each player and capable of wireless communication with the golf cart based components; and a network of remote components configured to store and communicate the game data collected by the data capture apparatus and spatial data relative to generating a layered course map for in-game and post-game data processing, the network of remote components including a web server configured to provide access to an interactive website, at least one relational database, and a geographic information system server, wherein the plurality of data processing function to process the game data and generate output data representative of different characteristics of a golf game are performed by one or more of a game card module configured to generate at least a real-time golf game scorecard, a game board module configured to generate a three-dimensional aerial rendering of a golf course and individual golf holes to form the layered course map, a swing capture module configured to enable a player to record video of golf shots during a golf game using the plurality of video cameras, a leader board module configured to compare and rank players based on game statistics at least including driving distance, fairways and greens hit, and putting accuracy, a shot advisor module configured to generate recommendations for how to conduct a particular golf shot based on compiled shot statistics of a player and current course conditions, a player history module configure to store at least player shot statistics, videos, and descriptions of golf games conducted, a sports book module configured to enable placing of wagers during the golf game, and a play-a-pro module configured to enable a player to conduct a virtual game against one or more other players with data collected during previous data collection sequences or stored in the one or more database locations.

In still another aspect, the present invention is a method of augmenting a golf game, comprising collecting data from at least one golf player, the at least one player having a data triggering device capable of initiating a data collection sequence at a location proximate to the player, and having a global positioning device capable of configuring a plurality of video cameras to record data during the data collection sequence relative to a golf shot; processing the data within a plurality of modules configured to integrate the data collected in the data collection sequence into a plurality of game features for different characteristics of a golf game, the plurality of modules including one or more of a game card module configured to generate at least a real-time golf game scorecard, a game board module configured to generate a three-dimensional aerial rendering of a golf course and individual golf holes to form the layered course map, a swing capture module configured to enable a player to record video of golf shots during a golf game using the plurality of video cameras, a leader board module configured to compare and rank players based on game statistics at least including driving distance, fairways and greens hit, and putting accuracy, a shot advisor module configured to generate recommendations for how to conduct a particular golf shot based on compiled shot statistics of a player and current course conditions, a player history module configure to store at least player shot statistics, videos, and descriptions of golf games conducted, a sports book module configured to enable placing of wagers during the golf game, and a play-a-pro module configured to enable a player to conduct a virtual game against one or more other players with data collected during previous data collection sequences or stored in the one or more database locations; and generating the integrated data from the data processing modules in a plurality of output data representative of the plurality of game features for presentation to the user on at least one interface, the plurality of output data configurable by the user to view and manipulate golf game information on the at least one interface to enhance a game of golf during and after play.

Other objects, embodiments, features and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention reference is made to the accompanying figures which form a part thereof, and in which is shown, by way of illustration, exemplary embodiments illustrating the principles of the present invention and how it is practiced. Other embodiments will be utilized to practice the present invention and structural and functional changes will be made thereto without departing from the scope of the present invention.

Figure 1:
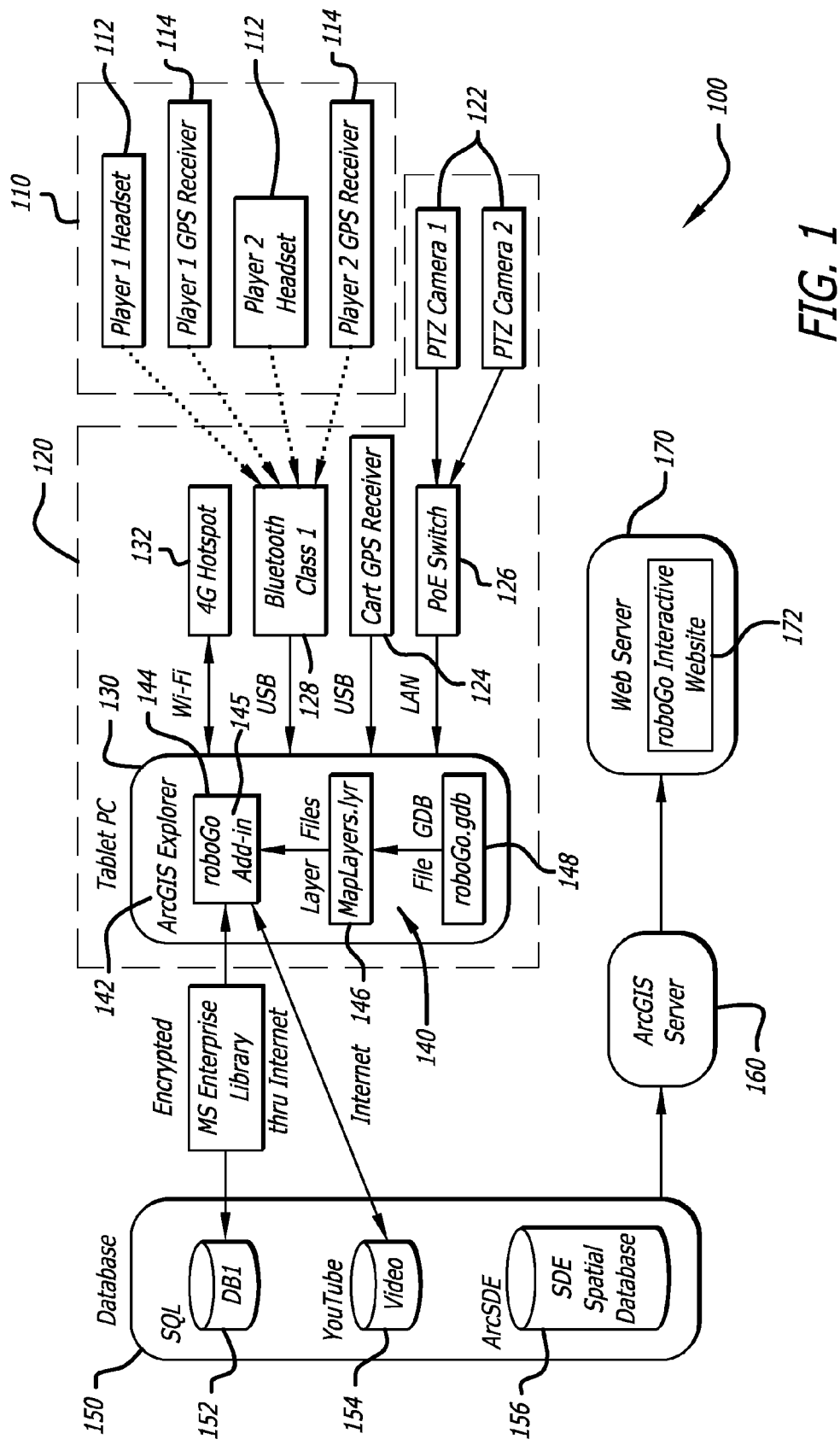
FIG. 1 is a block diagram of hardware and software system components in a golf game management and entertainment apparatus according to the present invention.

FIG. 1 is a block diagram of hardware and software system components in a golf game management and entertainment apparatus 100 that is capable of integrating all aspects of game-related content in an end-to-end player experience according to the present invention. The golf game management and entertainment apparatus 100 includes a plurality of front-end, or player interface, components, and a plurality of back-end, data processing components. The front-end components include player-based components 110 that transmit signals to golf cart-based components 120. These signals are then communicated to one or more computer-based data processing components 130 configured to execute commands in one or more data processing modules 140. The computer-based data processing components 130 and the data processing modules 140 communicate data in real-time back and forth with at least one relational database 150 in a remote server-based framework that includes the at least one database 150, a geographic information systems server 160, and a web-server 170.

The player-based components 110 include a headset 112 and a global positioning system device 114 for each player wishing to participate in the player experience provided by golf game management and entertainment apparatus 100. In one aspect of the present invention, known as "Game Time", the golf game management and entertainment apparatus 100 is triggered by a signal, generated by a player through his or her headset 112, which initiates a data collection sequence from which one or more data processing modules are triggered. The headset 112 instructs the golf game management and entertainment apparatus 100 to begin determining data processing sequences that determine a player's position, in connection with his or her GPS device 114, and to record a golf shot about to be taken, as well as integrate other information about the player's game.

The present invention contemplates that players may initiate data collection sequences using a headset 112 in a number of ways. Players may depress a button on the headset 112, or may use voice commands spoken into a speaker coupled to the headset 112. The headset may also include a motion sensor and a motion recognition component that is a configured to detect a player beginning to perform a shot and generate a signal. The headset 112 may also not necessarily be arranged to so as be worn or carried proximate to the head. It may be a device worn on clothing, affixed to or coupled to the golf cart, or coupled to a golf club.

These functions are performed by the golf cart-based components 120, which at least include one or more video cameras 122 and a cart-based global positioning device 124. The golf cart-based components may also include a power-over-Ethernet switch 126 for communicating with the one or more video cameras 122, and a wireless data communications receiver 128 such as for example a Class 1 Bluetooth receiver.

Figure 2:
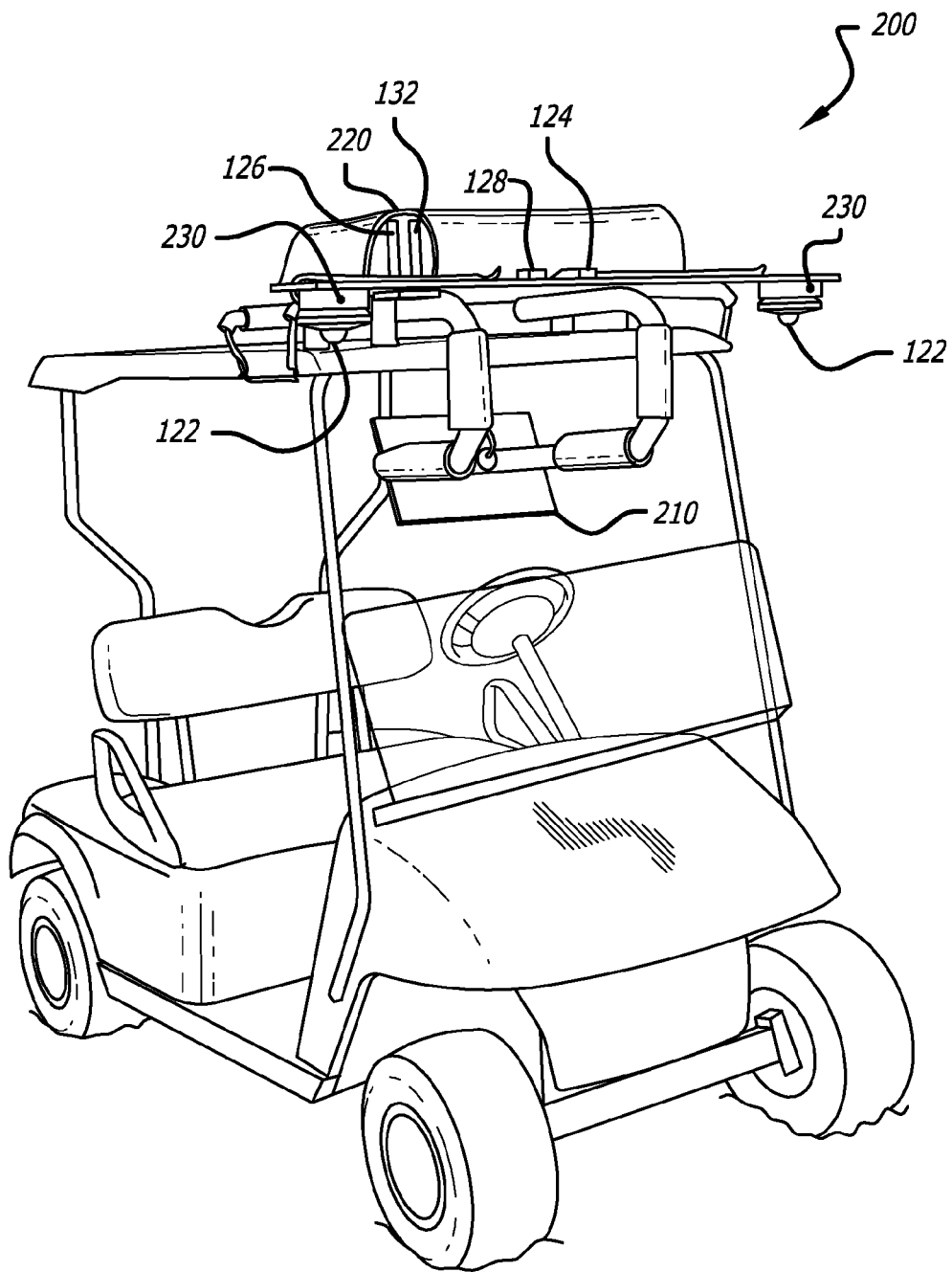
FIG. 2 is a perspective of a golf cart having game components coupled thereto.

The one or more video cameras 122 may be positioned at various places on the golf cart as shown for example in FIG. 2. The video cameras 122 may be capable of panning, tilting, and zooming to capture as much of the player's golf swing, trajectory of the shot, distance, and landing position as possible. The video cameras may be connected to the computer-based processing components 130 using a local area network communicatively coupled via the power-over-Ethernet switch 126 to handle larger file sizes associated with video images captured by the one or more video cameras 122.

The one or more computer-based data processing components 130 are housed in a golf-cart based computing system that includes a display 210, a housing 220, at least one microprocessor, the plurality of video cameras 122, the global positioning system 124, wireless communications components 132, one or more microphones 230 and others. The computing system may be any kind of computing system capable of performing the interface functions with player-based components and other golf cart-based components, modeling of data collected, displaying modeled game data to game players, and communication with one or more remote servers. The computing system may therefore be a tablet-type mobile computing device, a laptop or notebook-type computing device, a phone-based device or other personal digital assistant, or any other similar devices. The computing system may include memory for storage of data and instructions configured for the execution of one or more data processing modules.

The golf cart may include wireless communications components 132, such as those capable of mobile data communications protocols (such as for example 3G, 4G, and 5G protocols), and a wireless connection such as a Wi-Fi hotspot 132. These wireless communications components 132 are utilized to transmit game-related data in real-time to one or more remote servers and database locations for further processing of data, such as for example to update in-progress game scoring.

The one or more data processing modules 140 include a geographic information system module 142 and an add-in module 144 providing native functionality. These modules provide all on-board game functionality in the Game Cart framework of the present invention. The add-in module 144 applies concepts from robotics to model golf game data for augmented and enhanced user functionality, and incorporates additional data from one or more files resident in the computer-based data processing components 130. These include a map-layer files database component 148 and a layer files configuration component 146, which provide golf course map information, and other native-functionality data received from communication with external database sources, such as data maintained or stored in at least one database 150.

The add-in module 144 executes a plurality of processing functions 145 that perform pre-game, in-game and post-game features which provide the augmented reality and enhanced functionality for players of a golf game within the present invention. One processing function 145 provides a "Game Board" feature that provides windows and other graphical renderings of data on a graphical user interface. One aspect of the Game Board is a three-dimensional aerial view map of a golf course being played and individual holes using satellite imagery. The Game Board feature incorporates data from the on-board GIS module 142 and at least one database 150 and/or local GIS database 148. Hole features such as tee boxes, greens and hazards are overlaid onto raster imagery and/or vector-based basemap displayed to the user in this Game Board module, and locations where a player has taken shots are marked with customizable icons and captions indicating the golf club used and the distance of the shot taken. Shot lines are drawn between shots to enable an accurate comparison to a center line for each hole. In this Game Board module, the present invention selects the current hole and switches from one hole to the next automatically without intervention by a player. Players are still able to select any hole on the course to review a previous or upcoming hole. Output data relative to the Game Board module is shown in more detail in FIGS. 4-6 discussed further herein. It should be noted that raster imagery may include satellite or aerial images, and the disclosure is not intended to be limited to any one type of image presented on the Game Board.

The present invention calculates shot information for display in the Game Board 610 and shot history 520 based upon information gathered from subsequent shots and GPS points associated with those shots. Accordingly, distances for preceding shots are calculated by logic that is initiated by signals communicated by a player through headset 112. Communicating of signals for recording of subsequent shots includes communication of GPS points associated with the upcoming shots, so that logic functions performed by in the remote server framework and at least one relational database 150 calculate distances from previous shots and display images for those shots on the Game Board. The calculations and images displayed on the Game Board proceed in this manner for each subsequent shot.

Another processing function 145 provides a "Game Card" feature which automatically updates scoring and handicap calculations in real-time for a game in progress. The Game Card operates in single-cart, multi-cart, or tournament style and enables players to select different types of scoring, such as match, medal, scramble, and best ball play. Player shots are individually recorded by the video cameras 122 and the score is tallied automatically while the game is underway. The player has the ability to adjust the final score at the end of each hole. After multiple games have been played, a handicap may be instantly calculated and available for use during single or group play. The scorecard aspect of the Game Card module is displayed on the graphical user interface provided by the Game Board functionality of the present invention.

The present invention continuously updates scoring after shots are taken by wirelessly transmitting shot data to the at least one database 150 for calculation of a new score once the shot data has been processed within the Game Card feature. Once the score is calculated, the scorecard for the game is adjusted, updated, and transmitted to the one or more players playing the game from the at least one relational database 150 in the remote server-based framework in a hub-and-spoke manner. The Game Card feature therefore generates output data relative to scorecard functionality, and this output data is displayed on the graphical user interface as a golf game scorecard. In other words, when the computer-based data processing components 130 on the golf cart refresh, they pull fresh game data from the at least one relational database 150 in the remote server-based framework so that the database 150 is the central or focal point for the game time functionality of the present invention.

Data relative to a particular golf shot is collected by the video cameras 122, which have the ability to pan, tilt, and zoom depending on data indicated by the player's global positioning device 114. At least one camera 122 is configured to record the player's shot from the point the ball is struck, and at least one camera 122 may be configured to record the player's shot as it travels through the air and lands. The cameras 122 may be configured to record a shot being taken in a number of ways—regardless, it is to be understood that vector data regarding a shot is to be derived from both the video recorded and the global positioning data, so that scoring information and other data can be presented to the players for viewing and manipulation in other data processing modules as discussed herein.

Handicaps are calculated within the present invention according to standardized methods provided by the United States Golf Association or other similar governing body. The present invention implements logic associated with such standards and applies it in the automatic scorecard function once a game has completed. Since a handicap value does not change until a game is finished, it is contemplated that handicaps for players are to be calculated based on rolling results for the last, or most recent, number of games, for example 5. The present invention incorporates weights into such calculations based on factors such as other players against whom those last or most recent games were played. Handicaps will then be calculated in the remote server framework and communicated to golf carts and/or a Game Space once rounds of golf have been completed.

Figure 4:
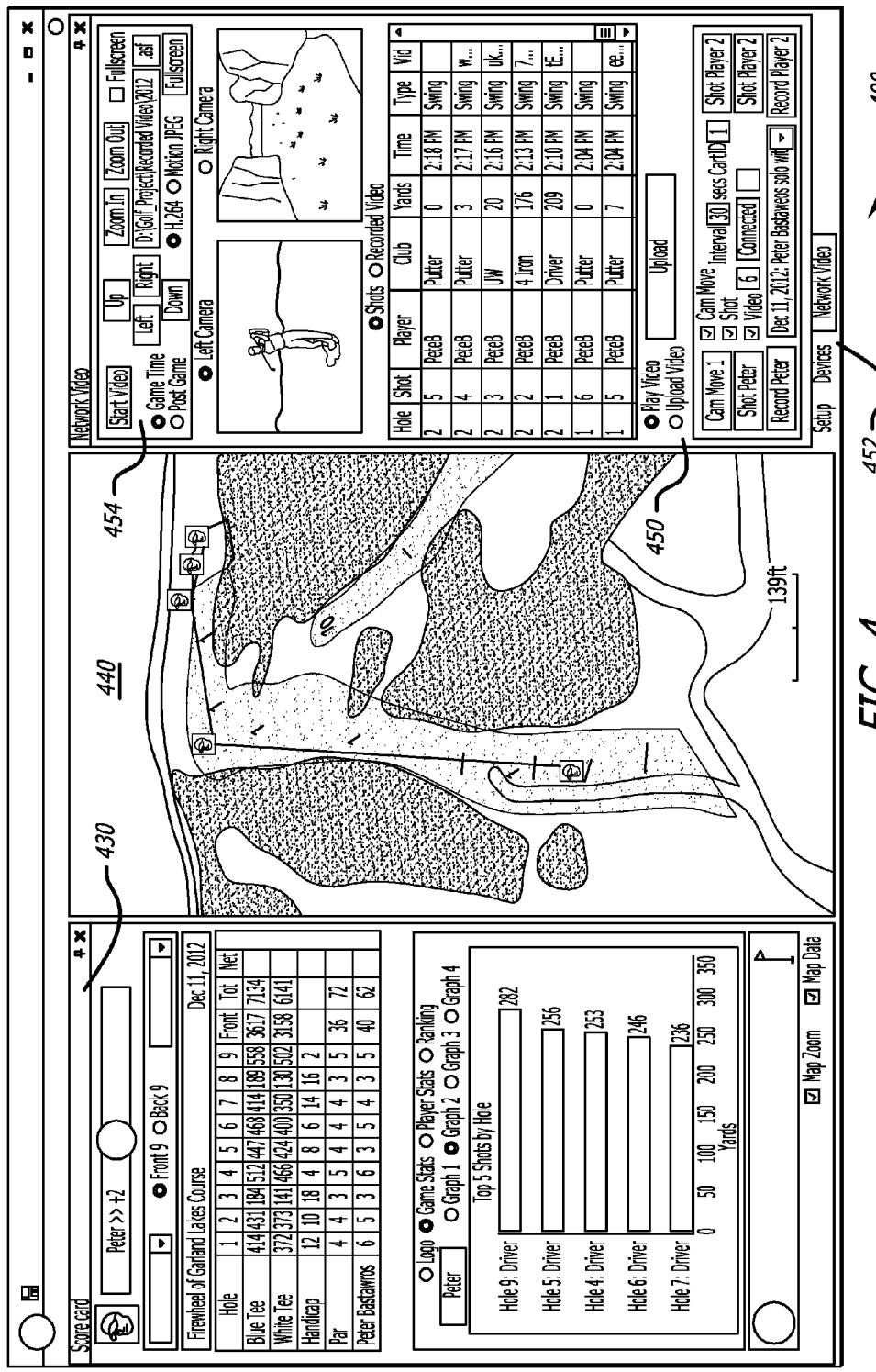
FIG. 4 is a screenshot of a graphical user interface displaying data generated by one or more data processing functions of the present invention.
Figure 5:
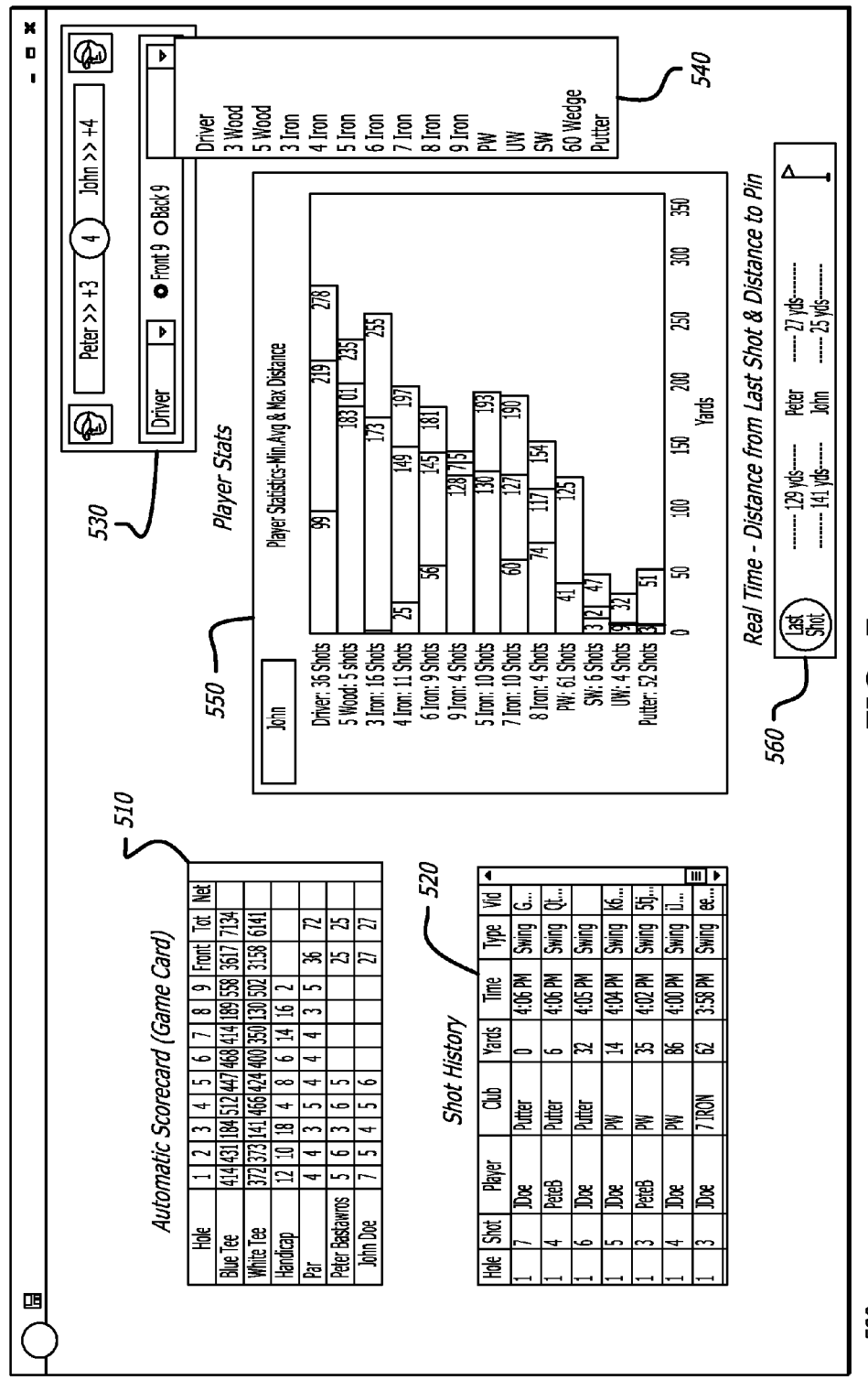
FIG. 5 is an exploded screenshot of features displayed on a graphical user interface generated by one or more data processing functions of the present invention.
Figure 6:
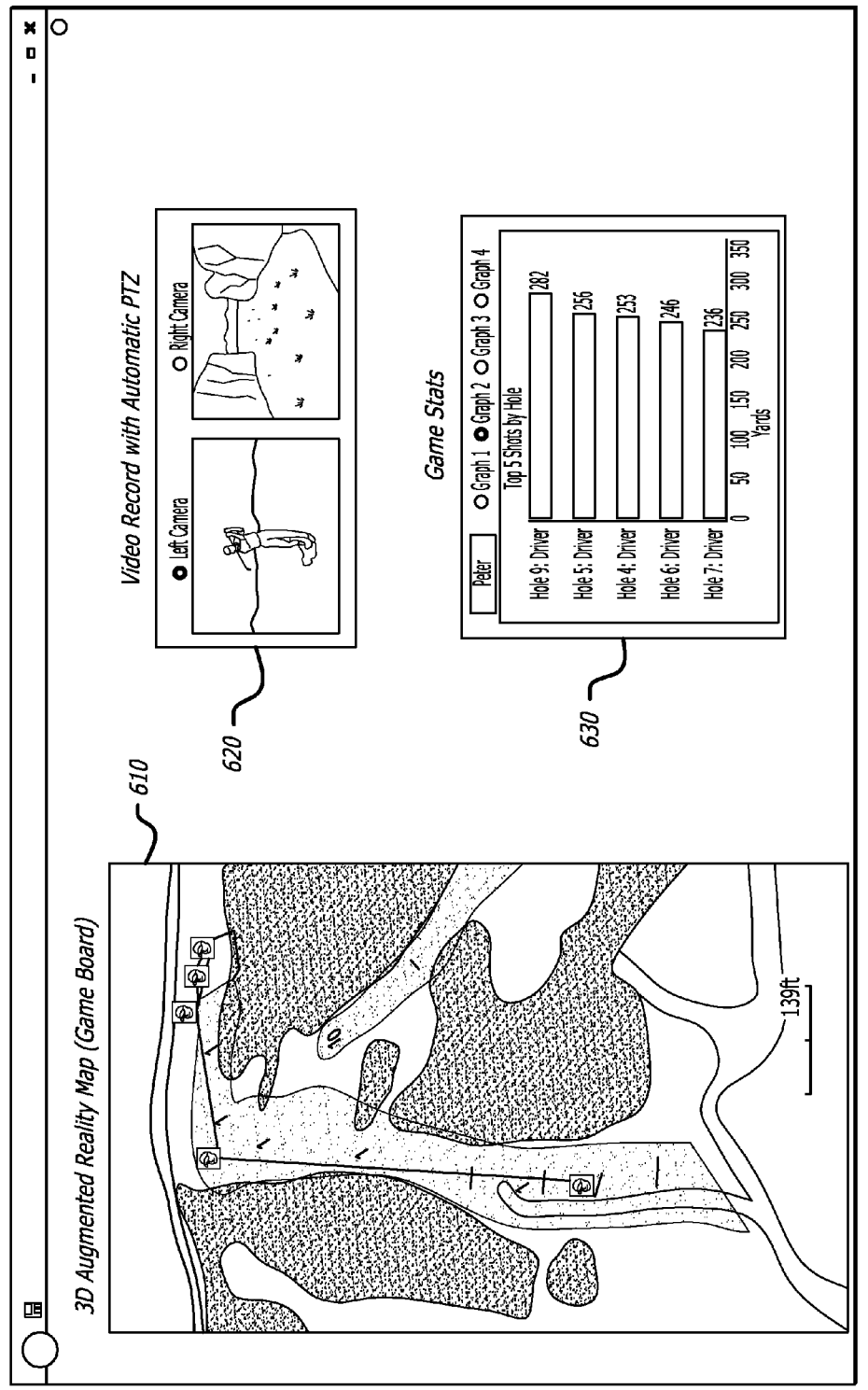
FIG. 6 is another exploded screenshot of features displayed on a graphical user interface generated by one or more data processing functions of the present invention.

Another of the processing functions 145 provides the ability to record player shots as noted above. This "Swing Capture" functionality enables a player to record specific video of their shots during a game using the video cameras 122 mounted on the golf cart. When a player signals the golf cart with his or her headset 112 as described above, at least one of the video cameras 122 records the player's swing and another camera 122 records the landing of the ball. In the Swing Capture module, the present invention may combine the recorded video into a single, uniform video for playback on a graphical user interface as shown in FIGS. 4-6. Each shot video may be linked to the map provided on the Game Board in the location where the shot was taken. These videos can be viewed by the player on the graphical user interface or on an interactive website 172, or can be shared with other players, for example as a highlight, on other carts or remotely via a platform such as YouTube. Viewers of the videos can tag them with emoticons or words such as "Like" or "Dislike", etc. for rating purposes, add comments for captioning purposes, or mark them as favorites for easy reference at a later time.

Another processing function 145 provides a "Leader Board" feature that compares and ranks players using a variety of game statistics. Game statistics used for comparing and ranking may include driving distance, fairways hit, greens hit, and putting accuracy. The Leader Board is presented during a game on the graphical user interface and is updated in real-time after each shot is taken by a player. The Leader Board feature may include the ability to alert players when changes in rank take place and identifies the number of positions in the rankings that a player has moved. Players are able to manipulate data in this data processing function 145 by selecting a particular statistic and accessing a detailed view, such as for example in a pop-up window on the graphical user interface, for more information if desired.

Another processing function 145 in the present invention is a "Shot Advisor" feature that serves as a "virtual caddy" to players playing a game of golf. In this module, the present invention provides recommendations for how to play a particular shot based on the player's individual shot history and current course conditions. The advice includes club selection, direction to aim, type of swing, and where to land the ball. This information is presented visually on the graphical user interface within the Game Board aspect of the present invention, and may be present in a manner similar to a golf video game. Players may use the headset 112, and methods of communicating signals using the headset 112 described, to override the recommendation of club selection in this module and select their own clubs. For example, if the module automatically selects a club recommended by Personal Shot Advisor from a list of clubs, the player may speak his or her own selection of a different club into the headset 112 and thereby change the data collection sequence so that the proper club is indicated.

Still another processing function 145 of the present invention is a "Player History" feature. In this module, player shots, videos, and descriptive details are recorded and saved in at the least one relational database 150 as a player's history to be used in a post-game mode, for future gaming purposes, or to be further analyzed for later downstream applications for third parties as described further herein. This information is therefore an example of content that is accessible in modes provided by either the "Game Cart" framework or the "Game Space" framework. The Player History module enables a player to review and compare past shots with those taken during a different game, against a different opponent, or on a different hole.

Yet another processing function 145 includes a "Sports Book" feature in which players are able to engage in betting amongst each other by placing side bets to make the game more interesting or to increase the ways in which they can win. In this module, popular or common betting options are selectable by the players, and players may be able to configure their own customized bets. The value of each bet may also be configured by the players for each game. Bets are placed on any player by any member of a Game Space. A bet status is updated in real-time in a manner similar to scoring, and final results along with payouts will be automatically calculated at the end of the game.

The data processing functions 145 also include a "Play-A-Pro" feature that allows a player to play a "virtual game" with one or more other players who may have physically played their game(s) on different dates or times. In this module, the shots of these virtual players are displayed to the physical player in a shot-by-shot manner as if they were playing the game at the same time. The physical player will be able to view shot videos, player comments, and compare game statistics with the virtual player(s). It is contemplated that professional players may be recruited to play course(s) to allow amateur golfers to play a virtual game against them to assess their level of play and/or learn how the professional approaches each hole and shot on the same course. As with other modules, this functionality is also presented on the graphical user interface for players to view and manipulate.

The data processing functions 145 may further include a "Learn-From-A-Pro" feature that is an adaptation of the Play-A-Pro feature. Learn-From-A-Pro enables a golf professional or instructor to record GPS data and video of each shot and provide lessons in the form of commentary and/or instruction as to how the shot should be approached and played. These lessons can be made accessible to players in different ways, depending on their preference and particular situation.

On such way is provided in a Shot Lesson mode, in which individual shot lessons are made available to players during a live game. Based on the current position of the golf cart, the Game Board map indicates whether one or more shot lessons were recorded within proximity of that position. Those shot lessons will be visually indicated on the map using special icons. The player may select a shot lesson icon which links to the audio and/or video recording of the golf professional or instructor. The Game Board map also displays the starting and ending points of the instructional shot and a shot line from point-to-point to illustrate the expected results of the lesson.

Another way to make lessons accessible is in Game Lesson mode, in which a game lesson is a collection of shot lessons that were recorded for an entire game played by the golf professional or instructor. In this mode, the player initially chooses to take a lesson rather than just play a normal game. The player chooses from a menu of pre-recorded game lessons offered by the golf course. Each game lesson may include different shot lessons depending on how the golf professional or instructor played a particular game. The player is able to browse the types of shot lessons available within a particular game lesson in order to decide which one to select. During a game lesson, the player plays the game similar to a "scramble" format whereby the player hits his or her shot from the same location as the golf professional or instructor.

Together, all of these data processing functions provide the augmented reality approach, and the interactive functionality for players within the game, after the game, and across multiple platforms, that result in an enhanced experience for players within a game of golf. Additionally, the modules configured to execute the data processing functions described herein utilize data extracted from shots based on player-initiated signals. The modules transform data extracted from GPS points and video cameras by performing one or more mathematical calculations to generate output data that performs the enhanced functionality presented on the Game Board and described above for viewing and manipulation to enhance the in-game and post-game golfing experience. All of these modules model golf shot data and generate output data to be displayed on the graphical user interface.

Returning to FIG. 1, the golf game management and entertainment apparatus 100 includes the at least one relational database 150, which further includes at least a SQL portion 152, a video portion 154, and an SDE spatial database portion 156 that extends the SQL portion to more types of data such as spatial data and provides vector-based spatial data for the add-in module 144. The SQL portion 152 is the primary resident source of data for the add-in module 144, and provides substantially all of the data needed to perform the in-game processing functions 145 of the data processing modules 140.

The geographic information systems (GIS) server 160 conducts map functionality of the Game Space framework of the present invention. The Game Space as noted above is a virtual clubhouse designed to connect pre-game and post-game activities of players with their game-time experiences. Players can create their own Game Space or join those created by another player. Members of a Game Space can view other players' shots, scores, and statistics, make comments, propose and organize new games, search for courses, make reservations, get directions, and coordinate meetings. Each of these functions is performed by one or more data processing modules resident on or accessed by the web server 170. The web server 170 of the present invention is responsible for providing access to, and content requested for, an interactive website 172 that permits player interaction over the Internet. Players may access this functionality and manipulate content, such as for example by entering and posting comments, using the interactive website 172.

The present invention may further include a mobile device-based application 180, not shown in FIG. 1, that provides members limited access to Game Space features.

Members can view and respond to other players' comments, accept and decline game invitations, search for courses, make reservations, get directions, and coordinate meetings using a tablet or other device.

FIG. 2 is a perspective view of a golf cart 200 having components associated with managing a golf game and providing entertaining content according to one embodiment of the golf game management and entertainment apparatus 100 of the present invention. The golf cart 200, as noted above in the description of FIG. 1 with respect to the golf cart-based components 120, includes a display 210 and a housing 220 within which the computer-based data processing components 130 are maintained. The golf cart 200 also includes the video cameras 122, microphones 230, and a cart-based GPS device 124. Additional components inside the housing 220 may include hardware 132 for the wireless connectivity with the player-based components 110, including the Bluetooth receiver 128, and the power-over-Ethernet switch 126. Wireless transmission and reception hardware for communicating data to and from the at least one relational database 150 may also be included within the housing.

It should be noted that the golf cart-based components 120 are capable of communicating with the player-based components 110 using any wireless communication framework. Therefore, although Bluetooth connectivity is one such framework contemplated herein, any technology which permits communication over a dedicated and small personal area network for exchanging data over short distances is within the scope of the present invention.

Figure 3:
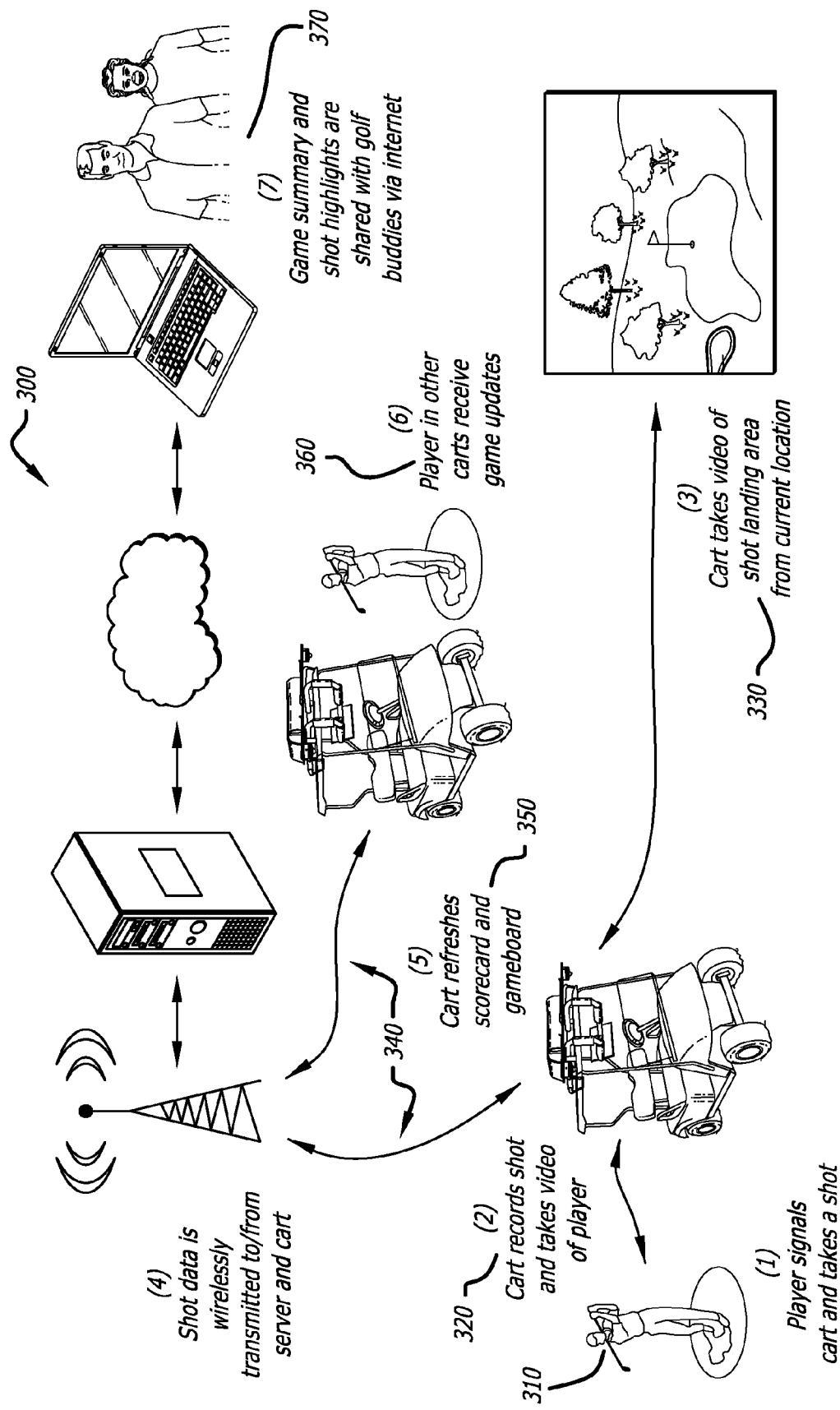
FIG. 3 is a diagram of steps in a process of implementing the present invention.

FIG. 3 is a diagram 300 of steps in a process of participating in and managing a golf game, and accessing entertainment content therein, according to another embodiment of the present invention. A player in a golf game triggers functionality in the present invention by activating a device that is to be worn by or proximate to the player, such as for example the headset 112. The headset 112 transmits a signal 310 to the golf cart-based components 120 to prepare to capture data in a data collection sequence. The player then proceeds to perform his or her shot in the golf game. The cart-based components 120 initiate the data collection sequence by collecting data from the global positioning device 114 that is player-based, and then record 320 the shot, using one or more of the cameras 112 to record video, and the microphones 230 to record sound. The cart-based components 120 also record 330 additional data regarding the shot, such as landing distance from the current location, and other information such as the trajectory of the shot, the terrain in which the ball lands, and the location of the ball to enable, for example, the player to find the ball.

The data recorded by the cart-based components 120 at steps 320 and 330 is then wirelessly communicated 340 between the golf cart 200 and the cart-based components 120 to the at least one database 150. This data is processed by one or more processing modules accessed from the at least one relational database 150, which performs the updating of the in-game scorecard and enables the Game Board to be updated accordingly. As noted above, the at least one relational database 150 applies logic to data recorded in steps 320 and 330 and communicated in step 340 to calculate shot data based on subsequent data points collected in data collection sequences for later-occurring shots, and transmits this information back to refresh the Game Card. Communication of the shot data also enables players in other carts to receive and view 360 game updates as data is processed and transmitted from remote locations performing Game Board processing.

The golf game management and entertainment apparatus 100 also provides 370 data to the players over the Internet, such as a game summary and shot highlights. Additional data manipulation may be performed using the functions in the one or more data processing modules resident on or accessed by the at least one relational database 150, and displayed to players in the golf cart 200 from which the shot information was captured, players in other golf carts, and to others over the Internet.

FIGS. 4-6 are exemplary screenshots of entertainment content provided on a graphical user interface in the game time mode within the Game Cart framework of the golf entertainment and game management apparatus 100. This in-game mode and attendant functions accessible therein are performed by the one or more data processing modules 145 represent in-game functionality available to players in the present invention, as noted above. The entertainment content is provided by the GIS module 142, together with the add-in module 144 and the one or more data processing modules 145, and displayed to players, either on a display 210 in a golf cart 200 in the Game Cart framework or over the internet via the web server 170.

FIG. 4 is an example of a default page 400 for a Game Board in the Game Cart framework in the golf game management and entertainment apparatus 100.

The Game Board default screen 400 of the present invention may also include a scorecard window 430 that displays statistics about a player's performance during a golf game. These statistics, which can be customized by the player using the graphical user interface, may include his or her current score, the portion of the course currently being played, the player's score per hole, the par per hole, the handicap, and other statistical data related to the holes being played. The player may also, in a separate part of the scorecard window 430, toggle between game stats, player stats, and rankings, and may display data such as drive yardage per hole in various graphical representations.

A map window 440 on the Game Board default screen 400 provides digital rendering of a hole selected by a player. The map window 440 shows an overhead view of the entire hole, including the tee area and surrounding terrain, and provides a linear overlay on the map with the player's shot statistics. Players may be able to move a mouse over, or touch and tap, portions of the map window to zoom in a particular shot or to play video of a shot that has been made. Players may also be able to activate pop-up windows with historical data regarding, for example, previous rounds played by the same player on the same hole, or other player data.

In one embodiment, the map window 440 shows multiple layers of information. A base layer is the course map provided by the GIS server 160 and/or the GIS module 142. Raster imagery and/or vector-based GIS data may be overlaid on the map to show particular non-interactive content, such as information about hazard or course conditions. The player's shot statistics may then be overlaid as a vector layer on top of this GIS data, so that the player may conduct interactive operations such as for example zoom, activating pop-ups, and video playback.

Another window 450 in the Game Board default page 400 is the location therein in which videos of player shots are to be played via the graphical user interface. A tabbed section 452 may allow players to select between "Setup," "Devices," and "Network Video" in this video function window 450. When the Network Video tab is selected in the tabbed section 452, players are able to select from a plurality of buttons 454 within the video function window 450 to view videos of shots taken by the video cameras 122 on the golf cart 200. Players may select from which video camera 122 to view recorded videos, and can select from a list of holes and shots. The list also provides additional statistical information such as the type of golf club used. The buttons 454 include a Start Video button, the ability to select from different directions, the ability to zoom in or out, and the ability to enter into a full screen mode. Other selectable features may also be available, such as an adjustment of the resolution of the video. Players may also select from a "shots" item and a "recorded video" item. Selection of the "shots" items lists all shots, as shown in FIG. 4. Selection of the "recorded video" item lists video clips taken during the game by the video cameras 122. Selection of a particular video may open a pop-up window within which the video can be played, saved, or shared, either via email or another messaging platform, such as for example YouTube, Facebook, Twitter, Pinterest, or Tumblr.

It is to be understood that the Game Board default screen 400 can be configured in many different ways. Windows may be moved, re-sized, or closed, so that no one configuration is to be preferred. Nonetheless, the system may be configured to certain defaults, such as those in the example screenshot of FIG. 4.

FIG. 5 is an example of windows displaying information generated from the one or more data processing functions 145 selected within the Game Cart framework, and shows an exploded screenshot 500 of entertainment content provided on the Game Board on the graphical user interface. FIG. 5 shows an Automatic Scorecard window 510, which displays in-progress scoring of the golf game being played. FIG. 5 also shows Shot History window 520 which displays hole-by-hole and shot-by-shot statistics for each player during the game being played.

As noted above, the one or more data processing functions 145 includes a Shot Advisor module that provides a "virtual caddy" to players in the Game Cart framework with assistance in, for example, club selection and determining how to perform a particular shot. FIG. 5 shows a Club Selector and Personal Shot Advisor window 530, which provides information generated by this module to the player regarding the selection of a golf club and for a particular shot to be made. The Club Selector and Personal Shot Advisor window 530 includes a pull-down menu 540 listing available golf clubs, and displays Player Stats in a shot statistics window 550 showing minimum, maximum, and average hitting distance for each club. The Shot Advisor module also includes display of a real-time, in-play hole tracker window 560 that shows a player where the player is on a particular hole, relative to both the distance from the last shot, and the distance remaining to the pin. Players may manipulate this data to customize it by, for example, entering information related to a custom club they are using for a particular game, and entering custom names for clubs in their golf bags.

FIG. 6 is a further example of windows displaying information generated from the one or more data processing modules 145 selected within the Game Cart framework, and shows an exploded screenshot 600 of entertainment content provided in the Game Board module on the graphical user interface. FIG. 6 is a further exploded view of windows displayed in FIG. 4. FIG. 6 shows a Game Board map window 610, which displays a three-dimensional augmented reality map of a particular hole being played on a golf course. The Game Board map window 610 is an overlay of data processing by the add-in module 144 and the GIS module 142 onto a three-dimensional GIS rendering of the actual course. FIG. 6 also shows close-up views of video recorded with the video cameras 122. These video windows 620 enable the player to watch video recorded from the golf cart 200 and to select from cameras 122. Also shown in FIG. 6 is a Game Stats window 630.

The geographic information system server 160 and geographic information system module 142 are third party map-related products that integrate hardware, software, and data for analyzing and displaying geographically-referenced information. The present invention contemplates that the GIS server 160 is an ArcGIS server, provided by Esri, Inc., that provides centralized management of all mapping, imagery, and geodata management related to golf courses on which golf games will be played. The GIS module 142 is a cart-based module that permits the present invention to visualize map-related data by accessing ready-to-use base maps and layers, stored at least in part in the map-layer files-based database component 148. The GIS module 142 also permits the present invention to integrate golf data collected with mapping services provided by the GIS server 160, and may also allow players to create custom maps. The GIS module 142 is also configured to add overlays to golf course maps as discussed above, and perform spatial analysis on the map data to provide content via the Game Board such as for example in the Shot Advisor module. The present invention contemplates that the GIS module 142 is an ArcGIS Explorer module, also provided by Esri, Inc.

The present invention further contemplates that GIS components such as the GIS server 160 and the GIS module 142 may be natively built to provide further customized functionality in the golf entertainment and game management apparatus 100. For example, the present invention may incorporate specialized golf course data that permits more detailed spatial data integration with collected golf shot data. Natively-built, golf-course specific GIS data may be used to provide a deeper level of detail for players using the present invention when their shot data is integrated using the multiple data processing modules and functions 145. Such specialized golf course data may be provided, for example, by golf course managers to provide an even more enhanced and unique playing experience.

The present invention further contemplates that data collected from players via the global positioning devices 114 and 124, and the video cameras 122, and other methods of capturing golf shot data, may be stored in the at least one relational database 150 for uses beyond integration within the golf entertainment and game management apparatus 100. The collected data may be modeled in any number of ways depending on consumer need. Such uses include packaging data sets for third party uses and applications. There are many possible examples of such uses and applications. For example, golf courses may be interested in acquiring data on how players of various skill levels have fared on their courses. Weather information may be collected in conjunction with golf games, and courses may be interested in learning how weather conditions affect players of various skill levels, so that adjustments in course terrain can be made. Golf courses may also be interested in developing mobile applications to simulate play on their courses, and making those applications available to enthusiasts for play on mobile devices. Such applications may incorporate actual historical data played on those courses. Video game manufacturers may be interested in acquiring historical data for particular courses to simulate play on those courses. Golf equipment manufacturers, such as club manufacturers, may be interested in acquiring information related to the present invention's Shot Advisor module, in which recommendations are made to players regarding which clubs to use, and how to play a particular shot with a club.

The present invention therefore includes, in one or more additional embodiments, methods of modeling data for delivering particular types of information that are meaningful to commercial enterprises. One such embodiment may include a method and system of determining and delivering golf club usage and performance data. Another such embodiment may include a method and system of assisting in golf course development. Yet another such embodiment may include a system and method of modeling the impact of weather conditions for managing golf course activities. It is contemplated that many such systems and methods of manipulating collected data for later uses and applications by third parties is contemplated. Still further, the present invention contemplates that additional data processing modules may be developed and incorporated to model collected golf shot data for specific commercial purposes.

In another aspect of the present invention, when a player takes a shot during a golf game, an avatar representing that player is placed on the Game Board and visible in the user interface. The golf game management and entertainment apparatus 100 contemplates an automated method of creating a player avatar, which is to be stored in a database collection for that player's game history. Using the video stream from the cameras 122 in the Game Cart framework, the player's face is detected using a facial detection module. An image from the video stream is saved and trimmed around the detected face and saved to the player's game history in the database for immediate use in the gaming experience provided by the Game Cart framework. One example method for facial recognition and detection is a Haar-like classifier cascade method that employs computer vision techniques to perform image object detection. Other similar methods are also within the scope of the present invention, and it is to be understood that it is not to be limited to one method of capturing a likeness of a player from a video stream, associating that likeness with a player and storing it in a database, and presenting the likeness to represent the player in either the Game Cart or Game Space frameworks described herein.

It is to be noted that data collected and communicated within the present invention may be encrypted to add elements of data security to the golf game management and entertainment apparatus 100 and preserve the integrity of data stored regarding player histories for future application. The present invention at least applies data encryption techniques for transmission from the at least one database 150 to the roboGo add-in 144 and other data processing modules 140 to ensure integrity of the data for in-progress game within the Game Cart framework.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. For example, the present invention may include data export capabilities to transmit course and club data to a third party, such as a golf club manufacturer, to allow the manufacturer to analyze how to improve a player's experience using its clubs. Similarly, data may be exported to golf course management to improve the golfing experience at their facility. The present invention may include a video game portion which permits players to design their own virtual courses and play those courses with simulated "professional" players, or against themselves, using historical data. It is therefore intended that the scope of the invention be limited not by this detailed description.

The invention claimed is:

1. A computerized method of golf game management to provide enhanced golf performance evaluation, comprising:
   receiving a signal transmitted from a first local point to begin a data collection sequence, and data from a player-based global positioning device at the first local point, over at least one wireless connection a location proximate to the first local point;
   recording, at the location proximate to the first local point, a plurality of data relating to a golf shot during the data collection sequence, the plurality of data including a first video of a player conducting the golf shot on a golf course, and a second video of the golf shot at a second point distant from the location proximate to the first local point, the recording including configuring at least one of a pan, tilt, and zoom function determined by the data received from the global positioning device so that the first video and the second video automatically record the plurality of data relating to the golf shot during the data collection sequence in response to communication from the global positioning device transmitting a player's position without further player intervention;
   extracting game-related data from the plurality of data relating to the golf shot, the game-related data comprised of vector-based spatial data derived from at least one of the first video, the second video, and the global positioning device;
   processing the extracted game-related data and golf course data from a geographic information system, and periodically updating the game-related data as additional data is collected from additional data collection sequences, in a plurality of data processing modules within a computing environment and executed in conjunction with at least one processor, the data processing modules configured to evaluate one or more golf performance characteristics derived from the extracted game-related data and the golf course data; and
   delivering output data representative of the one or more golf performance characteristics to a user.

2. The method of claim 1, wherein the output data representative of the one or more golf performance characteristics includes at least one of golf equipment usage data relative to at least one of club selection and shot outcome, and course performance statistics relative to play on the golf course.

3. The method of claim 2, further comprising integrating the extracted game-related data, the golf course data, and weather data representing one or more weather conditions occurring or forecast to occur during conduct of the golf game.

4. The method of claim 3, wherein the course performance statistics comprise player performance data during the one or more weather conditions, so that processing the extracted game-related data and the golf course data from a geographic information system, and periodically updating the game-related data as additional data is collected from additional data collection sequences, further comprises modeling an impact of the one or more weather conditions to manage at least one of maintenance activities, course improvement, hole design on the golf course.

5. The method of claim 1, wherein the first local point is a player and the location proximate to the first local point is a golf cart, and further wherein the global positioning device and a device from which the signal is transmitted from the first local point are coupled to the player.

6. The method of claim 1, wherein the at least one wireless connection forms a personal area network for exchanging data over short distances.

7. The method of claim 1, wherein the at least one wireless connection uses Bluetooth devices.

8. The method of claim 1, further comprising uploading the first video and the second video collected during a data collection sequence on a web-based platform.

9. The method of claim 1, further comprising, in the plurality of data processing modules to evaluate one or more golf performance characteristics derived from the extracted game-related data and the golf course data, processing a three-dimensional aerial view map of the golf course and individual course holes using at least one of raster imagery or vector-based GIS data.

10. The method of claim 1, further comprising, in the plurality of data processing modules to evaluate one or more golf performance characteristics derived from the extracted game-related data and the golf course data, compiling game and shot statistics including one or more of driving distance, fairways and greens hit, putting accuracy, and club selection.

11. The method of claim 1, further comprising, in the plurality of data processing modules to evaluate one or more golf performance characteristics derived from the extracted game-related data and the golf course data, generating recommendations for conducting a particular golf shot based on compiled shot statistics of a player and current course conditions in a shot advisor module, and generating additional output data representing an outcome of a golf shot using the recommendations.

12. A golf performance evaluation system, comprising:
a plurality of golf cart-based components configured to locally capture of one or more golf performance characteristics of an in-progress golf game, at least including a data capture apparatus having a plurality of video cameras, a global positioning device, a wireless data transmission and reception connection, and one or more computer processors capable of manipulating and transmitting data captured by the data capture apparatus, and executing one or more instructions configured to perform a plurality of data processing functions to process game data collected by the data capture apparatus and generate output data representative of the one or more golf performance characteristics of an in-progress golf game;
a plurality of player-based components capable of wirelessly communicating with the golf cart-based components, the plurality of player-based components at least including a data collection triggering device and a global positioning device coupled to each player and capable of wireless communication with the golf cart based components so that the plurality of video cameras automatically record player information in response to communication from the global positioning device relative to a player's position without further player intervention; and
a network of remote components configured within a computing environment including at least one computer-readable storage medium having the one or more instructions stored therein, the one or more computer processors operable to execute the one or more instructions to 1) extract the game data collected by the data capture apparatus, the game data comprised of vector-based spatial data derived from at least one of the plurality of video cameras, and the global positioning device, and 2) store and communicate the game data collected by the data capture apparatus and spatial data relative to generating a layered course map for in-game and post-game data processing,
wherein the plurality of data processing functions to process the game data and generate output data representative of the one or more golf performance characteristics of an in-progress golf game are performed by one or more of a module configured to store and process performance characteristics that include at least one of golf equipment usage data relative to at least one of club selection and shot outcome, a module configured to store and process performance characteristics that include course performance statistics relative to play on the golf course, and module configured to provide access to the output data representative of the one or more golf performance characteristics to a user.

13. The system of claim 12, wherein the plurality of data processing functions include integrating the game data with weather data representing one or more weather conditions occurring or forecast to occur during conduct of the golf game, and modeling an impact of the one or more weather conditions to manage at least one maintenance activities, course improvement, and hole design on the golf course, the course performance statistics comprising player performance data during the one or more weather conditions.

14. The system of claim 12, wherein the wireless data transmission and reception device is configured to transmit over a long distance data representing a video of a golf shot to a remote server for uploading the video to web-based platform.

15. The system of claim 12, wherein the wireless data transmission and reception device forms a personal area network for exchanging data over short distances.

16. The system of claim 12, wherein the wireless data transmission and reception device includes Bluetooth connectivity.

17. A computerized method of evaluating golf game performance, comprising:
collecting data from at least one golf player, the at least one player having a data triggering device capable of initiating a data collection sequence at a location proximate to the player, and having a global positioning device capable of configuring a plurality of video cameras to record data during the data collection sequence relative to a golf shot so that the plurality of video cameras automatically record player information in the data collection sequence in response to communication from the global positioning device relative to a player's position without further player intervention;
processing the data within a plurality of modules configured within a computing environment comprised of a computer processor and at least one computer-readable storage medium operably coupled to the computer processor and having program instructions stored therein, the computer processor being operable to execute the plurality of modules to 1) extract game-related from the data collected in the game collection sequence, the game-related data comprised of vector-based spatial data derived from at least one of the plurality of video cameras, and the global positioning data, 2) integrate the data collected in the data collection sequence with golf course data and weather data that includes one or more weather conditions occurring or forecast to occur during conduct of the golf game, and 3) determine performance characteristics of a golf game that include at least one of golf equipment usage data relative to club selection, shot outcome for particular golf equipment usage, and course performance statistics relative to play on the golf course in the one or more weather conditions; and generating output data representative of the performance characteristics of the golf game for delivery to a user.

18. The method of claim 17, wherein the course performance statistics comprise player performance data during the one or more weather conditions, so that processing the data to determine course performance statistics relative to play on the golf course in one or more weather conditions further comprises modeling an impact of the one or more weather conditions to manage at least one of maintenance activities, course improvement, and hole design on the golf course.

19. The method of claim 17, further comprising storing collected data in at least one remote database location for in-game and post-game applications of player and shot data and for extracting information from the collected data for additional processing in third-party applications.

20. The method of claim 17, further comprising analyzing data from the global positioning device to configure the plurality of video cameras with respect to at least one of pan, tilt, and zoom functions to record video of the player during the data collection sequence.

21. The method of claim 17, comprising receiving data from a player over a wireless connection forms a personal area network for exchanging data over short distances.

22. The method of claim 17, further comprising transmitting, over a wireless connection, the video recorded during a data collection sequence for uploading to a web-based platform.

* * * * *